No. 893,099. PATENTED JULY 14, 1908.
J. H. REINHARDT.
COMPUTING SCALE.
APPLICATION FILED OCT. 22, 1907.
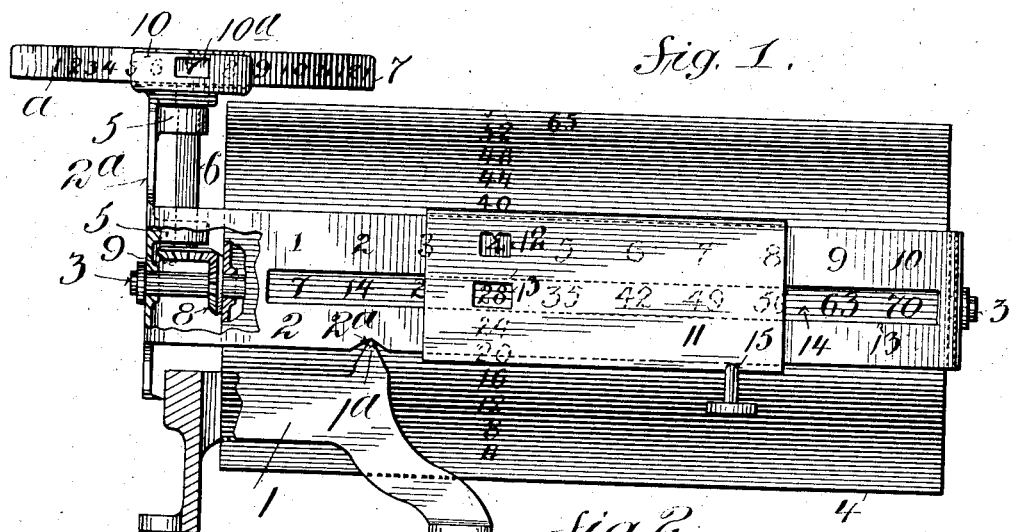
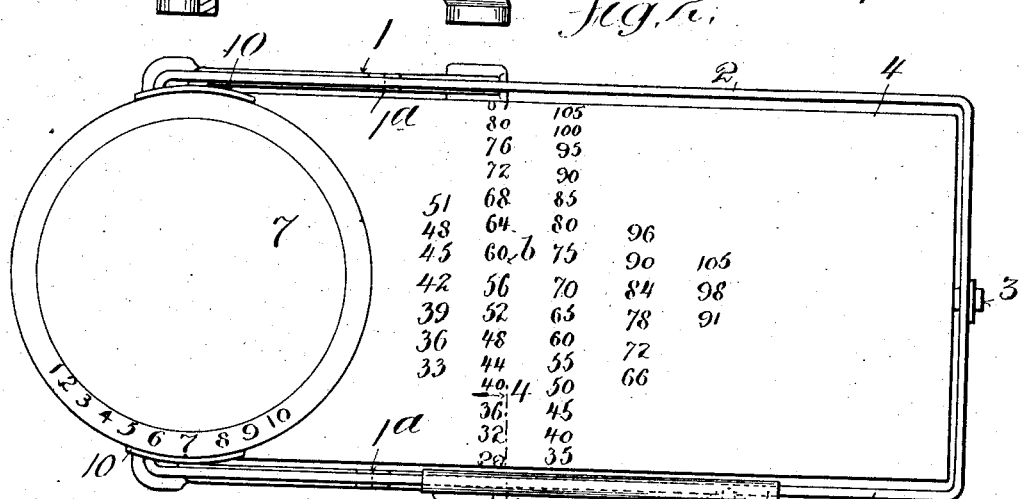
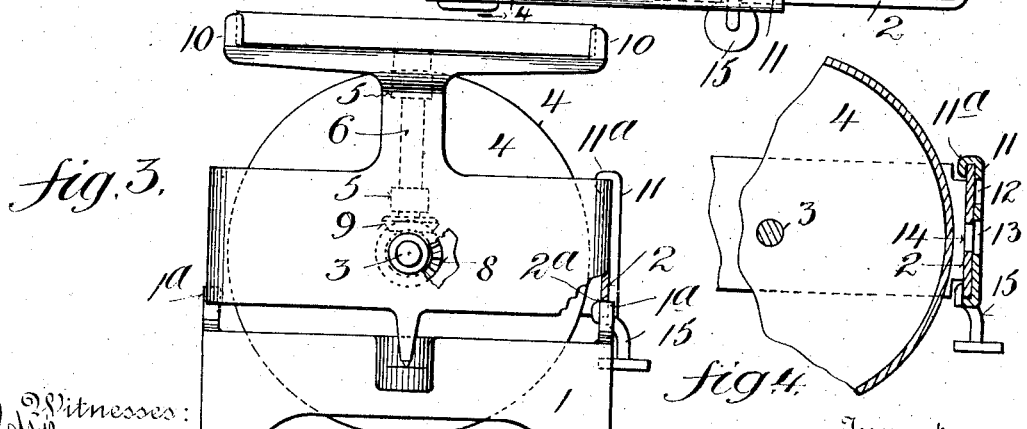

UNITED STATES PATENT OFFICE.

JAMES H. REINHARDT, OF EAST ORANGE, NEW JERSEY, ASSIGNOR OF ONE-THIRD TO WILLIAM H. VAN WART, OF BROOKLYN, NEW YORK, AND ONE-THIRD TO JAMES J. KEENAN, OF RIDGEWOOD, NEW JERSEY.

COMPUTING-SCALE.

No. 893,099.  Specification of Letters Patent.  Patented July 14, 1908.

Application filed October 22, 1907. Serial No. 398,553.

*To all whom it may concern:*

Be it known that I, JAMES H. REINHARDT, a citizen of the United States, and resident of East Orange, in the county of Essex and State of New Jersey, have invented certain new and useful Improvements in Computing-Scales, of which the following is a specification.

My invention relates to improvements in the class of weighing scales adapted to indicate the price or value of the article being weighed, and the invention has for its object to provide a simple scale having few parts adapted to be readily operated, not liable to get out of order and efficient in use.

In carrying out my invention I provide a suitable support or frame, a drum pivotally supported to be balanced thereon and provided with suitable circumferential rows of numbers, a platform or support for articles to be weighed connected with said drum to balance therewith, provided with numerals and adapted when rotated to correspondingly rotate the drum, a scale arranged adjacent the drum and having its numerals disposed relatively to the numbers on the drum, and a slide or shield mounted to be moved lengthwise of the drum, all whereby when the platform is rotated to indicate, say, the price per pound of the article being weighed, and the slide or shield is adjusted to indicate the weight of such article, the price or value of the article weighed will be indicated by the appropriate number on the drum.

My invention further comprises novel details of improvement and combinations of parts that will be more fully hereinafter set forth and then pointed out in the claims.

Reference is to be had to the accompanying drawings forming part hereof, wherein, Figure 1 is a side elevation, partly broken away, of a computing scale embodying my invention, some of the numbers being omitted; Fig. 2 is a plan view thereof, illustrating rows of numbers upon the drum; Fig. 3 is an end elevation looking from the left in Fig. 1, part being broken away, and Fig. 4 is a sectional detail, substantially on the line 4, 4, in Fig. 2.

Similar numerals of reference indicate corresponding parts in the several views.

The numeral 1 indicates a suitable base or support shown provided with fulcrum points $1^a$ upon which a suitable frame 2 is mounted for balancing, being shown provided with seats $2^a$ for the fulcrum points $1^a$, although the frame 2 may be balanced upon support 1 in any well known manner customary in weighing scales. Frame 2 is shown in substantially rectangular form, and at 3 is a shaft journaled in suitable bearings in the end bars of frame 2.

At 4 is a suitable drum or cylinder secured upon said shaft so as to rotate within frame 2. Frame 2 is also provided with suitable bearings 5, shown projecting from a portion $2^a$ of said frame, and at 6 is a shaft journaled in said bearings and carrying at its upper end a platform or support 7 to receive articles to be weighed. Shaft 6 is geared to shaft 3, as by suitable bevel-gears 8, 9, whereby as platform 7 is rotated drum 4 will be correspondingly rotated, and in the arrangement shown drum 4 is maintained substantially horizontal with respect to the axes of shaft 6 and platform 7.

At 10 is an indicator, shown in the form of a plate, located adjacent the periphery of platform 7 and provided with an opening $10^a$ through which price numerals $a$ applied upon the periphery of platform 7 may be seen according to the position of rotation of said platform. Arranged around the periphery of drum 4 are rows of numbers $b$ the arrangement of the numbers of each row $b$ being according to the multiple of the integer of such row. For instance, beginning at the left of the drum in Fig. 1 the numbers of such row $b$ will run in 1, 2, 3, order from the integer 1; the next row $b$ to the right having the integer 2 will run in the order of the multiple of such integer, as 2, 4, 6, etc.; the third row to the right starting with the integer 3 will run in the order of the multiple of such integer, as 3, 6, 9, etc., and so on to the right, the integer of each of said rows of numbers $b$ stepping one number up from the row at the left corresponding to the arrangement of row $a$. The arrangement is such also, that longitudinally disposed rows of numbers are on the drum ranging from left to right in multiples of the corresponding integer of the first left hand row of numbers $b$. Upon frame 2 and extending lengthwise of the drum 4 is a scale or row of numerals $c$ severally substantially alined with the corresponding rows of numbers $b$ upon the drum, and serving to indicate the integer of such row, such as beginning at the left in Fig. 1 the numerals $c$ will run in 1, 2, 3, order.

The numerals $c$ are intended to indicate the pounds or fraction of pounds, or other unit of weight, while the numerals $a$ on platform 7 indicate the price per pound, with or without fractions, while the numbers $b$ are to indicate the price of articles to be weighed.

At 11 is a shield or indicator, shown mounted to slide upon frame 2, and which is shown in the form of a plate having edges bent reversely at $11^a$ to hold the plate slidably upon a side bar of frame 2. Plate 11 is shown provided with an opening or indicator 12 in such position that numerals of the row $c$ may be seen through such opening, and said plate or shield is also shown provided with an opening at 13 alined with a slot 14 in the adjacent part of frame 2 that is alined with the longitudinal rows of numbers $b$, so that the numbers of such row can be seen through the shield at the same time that the corresponding numeral of row $c$ may be seen, as illustrated in Fig. 1. Shield 11 is also shown adapted to act as a counterweight for balancing the article being weighed, or as a support for weights, and for this purpose I have shown said plate or shield provided with a support 15 which may be loaded as required.

In accordance with my improvements the article to be weighed is placed upon platform 7 and the latter is rotated until a numeral of the row $a$, representing the price of the article, appears through the opening or at the indicator $10^a$; during such rotation of platform 7 the drum 4 will be correspondingly rotated to bring the horizontal row of numbers of the rows $b$, that correspond to or are multiples of the price numeral thus indicated on platform 7, into line with slot 14, and then plate or shield 11 is adjusted along frame 2 until the opening or indicator 12 shows by the appropriate numeral $c$, the weight of the article when properly balanced, and thereupon the price of the article for such weight at such price will appear through the opening or indicator 13. For instance, if the price of the article be 7 cents per pound, platform 7 will be rotated until the numeral 7 appears at the indicator $10^a$, and thereupon drum 4 will have been rotated until its horizontal row of numbers of the rows $b$, comprising multiples of the integer 7, will appear through slot 14, and if the weight of the article be 4 pounds, the plate 11 will be adjusted to bring indicator 12 into alinement with numeral 4 of row $c$, and thereupon the price 28 of the article will appear through opening 13. Thus, for each numeral of platform 7 that appears through the indicator $10^a$, the corresponding horizontal row of numbers on drum 4 will appear through slot 14, so that whatever be the weight of the article on the platform, the plate or shield 11 being adjusted to balance such weight, the indicator 12 showing by numeral $c$ such weight, the corresponding price per pound will appear at indicator 13.

It will be understood that while I have shown whole numbers only in the rows $a$, $b$, $c$, fractions may be indicated as well as whole numbers.

Having now described my invention what I claim is:

1. The combination of a drum provided with circumferential rows of numbers, a scale adjacent the drum having numerals corresponding to integers of said rows of numbers, a platform rotatively connected with said drum, and provided with numerals, an indicator for said numerals, and means to indicate the numerals of the scale and the corresponding number on the drum.

2. The combination of a drum provided with rows of numbers, a scale adjacent the drum having numerals corresponding to integers of said rows of numbers, a slide to indicate numerals of the scale and numbers on the drum, a platform connected with the drum to balance therewith, means to rotate the drum and platform in unison and proportionately, numerals upon said platform, and an indicator for said numerals.

3. The combination of a drum provided with peripheral rows of numbers, the numbers of each row comprising multiples of the integer of the row, said numbers also being arranged in rows extending longitudinally of the drum, and the numbers of each longitudinal row being multiples of a corresponding number of one of the peripheral rows of numbers, a scale adjacent the drum having numerals corresponding to the integers of the adjacent peripheral row of numbers on the drum, a platform connected with the drum to rotate in unison and proportionately with the drum, said platform being provided with numerals, an indicator for said numerals, and adjustable means to simultaneously indicate a numeral on the scale and a number on the drum.

4. The combination of a support, a frame fulcrumed thereon, a drum journaled in said frame, a platform journaled in said frame, gearing connecting the platform with the drum, said platform being provided with numerals, an indicator for said numerals, said drum having peripheral rows of numbers, a scale adjacent said drum and having numerals corresponding to the integers of the rows of numbers on the drum, and adjustable means carried by said frame to simultaneously indicate a numeral on the scale and a number on the drum.

5. The combination of a support, a frame pivotally carried thereby, a drum journaled in said frame, a platform having its axis substantially perpendicular to the axis of the drum, means carried by said frame for rotatably supporting said platform, gearing connecting the platform with the drum, said platform having numerals, said frame having an indicator for said numerals, said drum having peripheral rows of numbers, each row comprising numbers that are multiples of the integer of such row, said frame having a scale comprising numerals substantially alined with the rows of numbers on the drum and corresponding to the integers of the adjacent rows of numbers on the drum, and a slide adjustably carried by the frame and provided with means to simultaneously indicate a numeral of the scale and a number on the drum.

6. The combination of a support, a frame fulcrumed thereon and provided with a slot, a drum journaled in the frame and having peripheral rows of numbers, said numbers being arranged also in horizontal rows to appear through said slot of the frame, said frame having a scale provided with numerals substantially alined with the peripheral rows of numbers on the drum, a slide carried by said frame, and provided with indicating means to simultaneously indicate a numeral of the scale and a number on the drum, a platform rotatably supported by said frame to be balanced therewith, gearing connecting said drum with the platform, said platform having numerals, and an indicator carried by said frame for said numerals of the platform.

7. The combination of a drum provided with numbers, a scale adjacent the drum and having numerals, a platform rotatively connected with the drum and provided with numerals, an indicator for said numerals, and adjustable means to indicate the corresponding numerals and numbers on the scale and drum respectively.

Signed at New York city, in the county of New York, and State of New York, this 3d day of October, A. D. 1907.

JAMES H. REINHARDT.

Witnesses:
EDWIN HILBORN,
MARIE F. WAINRIGHT.